(12) United States Patent
Gaertner et al.

(10) Patent No.: US 10,049,691 B1
(45) Date of Patent: Aug. 14, 2018

(54) CHANGING DISK ACCESS OPERATIONS TO REDUCE SERVO CONTROL IMPACT IN A MULTIPLE ACTUATOR DRIVE

(71) Applicant: Seagate Technology LLC, Cupertino, CA (US)

(72) Inventors: Mark Allen Gaertner, Vadnais Heights, MN (US); Vidur Fnu Parkash, Shakopee, MN (US); Evgeny Kharisov, Chaska, MN (US); Josiah Natan Wernow, St. Paul, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/831,906

(22) Filed: Dec. 5, 2017

(51) Int. Cl.
| | |
|---|---|
| *G11B 21/04* | (2006.01) |
| *G11B 21/02* | (2006.01) |
| *G11B 5/55* | (2006.01) |
| *G11B 5/48* | (2006.01) |
| *G11B 21/08* | (2006.01) |
| *G06F 3/06* | (2006.01) |

(52) U.S. Cl.
CPC .......... *G11B 5/5578* (2013.01); *G11B 5/4813* (2013.01); *G11B 5/5547* (2013.01); *G11B 21/083* (2013.01); *G06F 3/0659* (2013.01); *G06F 3/0676* (2013.01)

(58) Field of Classification Search
CPC ..... G11B 2220/90; G11B 27/11; G11B 27/36; G11B 5/782; G11B 15/1875; G11B 15/1808; G11B 5/6005; G11B 5/59633; G11B 21/106; G11B 5/5526; G11B 5/5534; G11B 5/5552; G11B 5/596; G11B 5/5547; G11B 21/083; G11B 5/59627
USPC ........... 360/69, 70, 75, 77.05, 78.05, 78.06, 360/78.09
See application file for complete search history.

(56) References Cited

U.S. PATENT DOCUMENTS

| | | |
|---|---|---|
| 5,355,486 A | 10/1994 | Cornaby |
| 6,560,075 B2 | 5/2003 | Price et al. |
| 6,847,504 B1 | 1/2005 | Bennett et al. |
| 8,145,823 B2 * | 3/2012 | Olesinski ............ H04L 12/5601 710/113 |
| 2008/0123213 A1 | 5/2008 | Craig et al. |

\* cited by examiner

*Primary Examiner* — Nabil Hindi
(74) *Attorney, Agent, or Firm* — Hollingsworth Davis, LLC

(57) ABSTRACT

In a disk drive apparatus, a first time period is determined, during which a first head driven by a first actuator will be performing a first disk access operation. A second time period is determined, during which a second head driven by a second actuator will be performing a second disk access operation. The first and second actuators are independently movable such that the first and second disk access operations are capable of being performed in parallel. If it is determined that the second disk access operation will impact servo control of the first disk access operation, at least one of the first and second disk access operations is changed to reduce the impact to the servo control of the first disk access operation.

19 Claims, 5 Drawing Sheets

CHANGING DISK ACCESS OPERATIONS TO REDUCE SERVO CONTROL IMPACT IN A MULTIPLE ACTUATOR DRIVE

SUMMARY

The present disclosure is directed to changing disk access operations to reduce servo control impact in a multiple actuator drive. In one embodiment, a first time period is determined, during which a first head driven by a first actuator will be performing a first disk access operation. A second time period is determined, during which a second head driven by a second actuator will be performing a second disk access operation. The first and second actuators are independently movable such that the first and second disk access operations are capable of being performed in parallel. If it is determined that the second disk access operation will impact servo control of the first disk access operation, at least one of the first and second disk access operations is changed to reduce the impact to the servo control of the first disk access operation.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disk drives (HDDs). Additional HDD features described herein, generally described as "parallelism" architectures are seen as a way to improve HDD performance measures such as IOPS and latency. Generally, parallelism architectures utilize multiple read/write heads in parallel. Such parallelism can increase the rate of input/output operations (IOPS) and thereby speed up certain operations. For example, the data read from two heads can be combined together into a single stream, thereby doubling the throughput rate of data sent to the host. In other examples, different heads can service different read or write requests at the same time, thereby reducing overall latency, e.g., for random data access requests.

In embodiments described below, a hard disk drive includes multiple heads driven by the same or different actuators that can read from or write to one or more disks simultaneously. This may include separate and independent reading/writing, such as heads that are servicing different read/write requests. This may also include separate and dependent reading/writing, e.g., where parts of a single stream of data are being handled by different heads at the same time. The parallelism architectures is extended to other components that operate in the HDD, including system controllers, servo controllers, read/write channels, host interfaces, caches, etc.

In an HDD with multiple actuators, the movement of one of the actuators can interfere with the operation of the other actuator(s). The force exerted by an actuator can cause mechanical disturbance/vibration that affects other actuators. The greatest forces intentionally exerted during normal operation include forces applied during seek acceleration and deceleration. These forces are most likely to impact the ability to track settle and track follow on the other actuator (s). For certain operations such as settling and following operations while writing, the constraints are tighter than other operations (e.g., reading) due to the possibility of destroying previously written data due to mistracking. If these operations are disturbed significantly, then the write operation will be delayed or suspended resulting in degraded performance.

In embodiments described below, scheduling decisions of actuators is translated into time regions of potential disturbance to other actuator(s) and disturbance susceptibility. Scheduling on each actuator uses the disturbance factors of the other actuator(s) to determine the optimal operation to schedule and its corresponding seek behavior. In this way, cross-actuator disturbance can be minimized resulting in an increase in performance for some operations, e.g., write operations.

Figure 1:
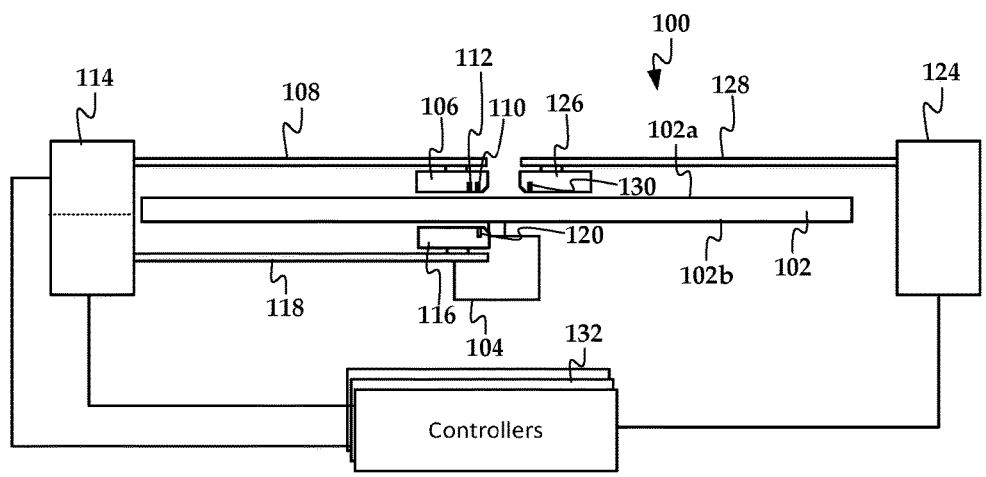
FIG. 1 is a diagram of an apparatus according to an example embodiment.

In FIG. 1, a diagram illustrates an apparatus 100 with parallelism features according to example embodiments. The apparatus 100 includes at least one magnetic disk 102 driven by a spindle motor 104. A head 106 (also referred to as a read/write head, read head, write head, recording head, etc.) is held over a first surface 102a of the disk 102 by an arm 108. An actuator 114 moves (e.g., rotates) the arm 108 to place the head 106 over different tracks on the disk 102. In one embodiment, the head includes a read transducer 110 and/or a write transducer 112. The read transducer 110 provides a signal in response to changing magnetic fields on the disk 102, and is coupled to a controller (not shown) where the separate signals are independently processed. The write transducer 112 receives signals from the controller and converts them to magnetic fields that change magnetic orientations of regions on the disk 102.

The apparatus 100 includes a second head 116 supported by a second arm 118. The second head 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator). In either configuration, the arms 108, 118 rotate around the same axis. The head 116 also includes read and/or write transducers 120. The transducers 120 are capable of reading from and/or writing to disk surface 102b simultaneously with one or both of read/write transducers 110, 112 that access disk surface 102a.

In another embodiment, the apparatus 100 includes a third head 126 supported by a third arm 128. The third head 126 (and its associated actuation hardware) may be included instead of or in addition to the second head 116. The third head 126 is held over the first surface 102a of the disk 102 as a second actuator 124 causes the third arm 118 to move to different tracks on the disk 102. The arm 128 and actuator 124 move independently of arm 108 and actuator 114. The head 126 includes read and/or write transducers 130. The transducers 130 are capable of reading from and/or writing to disk surface 102a simultaneously with transducers 110, 112 of first head 106.

In the examples shown in FIG. 1, more than one disk 102 may be used, and the actuators 114, 124 may be coupled to additional arms and heads that access some or all of the additional disk surfaces. In this context, "accessing" generally refers to activating a read or write transducer and coupling the transducer to a read/write channel. Independently movable heads that utilize a split actuator 114 may generally simultaneously access different surfaces, e.g., heads 106 and 116 access different surfaces 102a, 102b at the same time. Independently movable heads that utilize non-coaxial actuators 114, 124 may access the same surface at the same time, e.g., heads 106 and 126 may both access surface 102a at the same time, as well as accessing different surfaces at the same time.

One or more controllers 132 are coupled to the respective actuators 114, 124 and control movement of the actuators 114, 124. The controllers 132 may include systems on a chip that perform such operations as servo control, encoding and decoding of data written to and read from the disk 102, queuing and formatting host commands, etc. As pertains to the discussion below, the one or more controllers 132 have the ability to execute multiple media read/write operations concurrently.

Seek acceleration and deceleration of one actuator potentially disturbs operations on other actuator(s). The amount of disturbance may be unique for each actuator and vary based on the rate of acceleration and deceleration as well as other factors such as radial position. An operation may be susceptible to disturbance. The amount of susceptibility is related to the phase of the operation, such as seek settle and write track follow. Susceptibility may also vary per actuator, radial position, and other factors.

Figure 2:
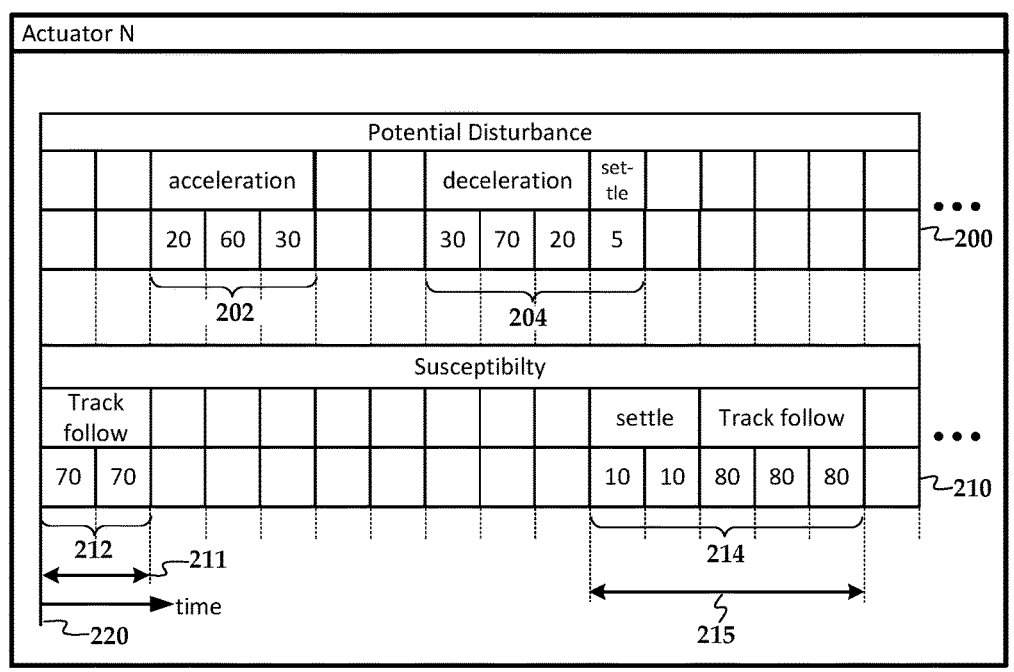
FIG. 2 is a block diagram showing disturbance and susceptibility data structures according to an example embodiment.

Potential disturbance and disturbance susceptibility may or may not be mutually exclusive. In FIG. 2, a block diagram illustrates tracking structures 200, 210 used to reduce the effects of disturbance according to an example embodiment. It is assumed that disturbance and disturbance susceptibility are not mutually exclusive so they are tracked separately in the individual tracking structures 200, 210.

Each cell of the tracking structures is associated with an explicit time (e.g., system time T) or inherent time (e.g., current time plus N). The data in the structures 200, 210 are populated from the current time 220 to a finite amount of time in the future (e.g., 50 ms) to reflect all scheduled operations on the actuator. Each entry contains a scaled value that represents the potential disturbance (in structure 200) or susceptibility (in structure 210) for an amount of time. The scaled values are one-byte hexadecimal values in this example, the value of which is determined based on factors noted above (e.g., radial position, type of operation, relative location of actuator, etc.). Note that the descriptive entries in the top row of the structures 200, 210 are intended to show example operations and are optional, e.g., not required to be stored with the structures 200, 210. An alternative to the scaled values shown in the structures 200, 210 is an index to be used for a table look-up. In other embodiments, disturbance and/or susceptibility could be computed based on formulas. Tables could provide the inputs to the formulas. Or instead of tables, a set of values/formulas could be used with a corresponding time duration. For example, disturbance could be represented by formula A for the next X ms, formula B for the next y ms.

In the illustrated example, Actuator N schedules a write operation at time period 215 while currently write track following at time 211. After determining the rate of the seek operation, this decision is translated into the tracking structures. Based on when the seek operation is scheduled to begin, seek acceleration and deceleration regions are translated into scaled disturbance values 202, 204 while the timing of write seek settle and track follow are translated into scaled susceptibility values 212, 214.

Each actuator translates scheduling decisions in this manner, and the translated data may be viewed by one or more schedulers that are used for servo control of the multiple actuators. The tracking structure describes expected timing; however there are instances when actual behavior is not as expected due to seek variance and other exception conditions. When these exception conditions occur, they can be ignored resulting in some miscalculations (see below) and poor scheduling decisions or the tracking structures can be adjusted upon detecting the exceptions to adjust the expected timing (e.g., shift values left or right in the structures to reduce or eliminate overlay, alter seek parameters to minimize interference).

Scheduling is performed for operations on each actuator. One goal of scheduling is to optimize performance (e.g., to minimize the time to service operations). Other factors may also be considered, such as power. When scheduling an operation, the access time of an operation is computed. For example, access time may be computed as seek time plus latency time. This result may be adjusted for other factors, such as the probability of the seek not completing in time.

What is proposed is that the computed access time is further adjusted by an offset time. The offset time may include one or both of the following terms: disturbance time and susceptibility time. The disturbance time is the computed time penalty on operations on other actuator(s). The susceptibility time is the computed time penalty on this operation due to disturbance caused by other actuator(s). The susceptibility tracking structures of the other actuator(s) are used for this computation. The disturbance forces of the operation under consideration are overlaid onto the susceptibility structures to determine the time penalty associated with the possibility that this operation causes a missed revolution (e.g., late settle or off-track fault).

Figure 3:
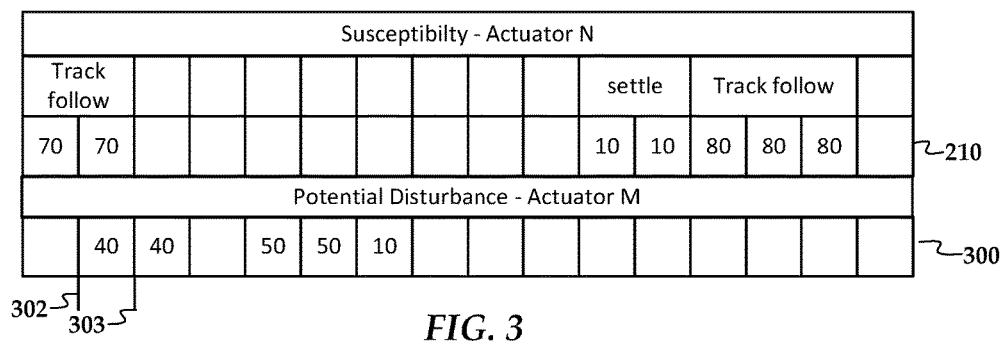
FIGS. 3, 4, 5, 6, and 7 are block diagrams showing scheduling of actuator operations using data structures according to example embodiments.
Figure 4:
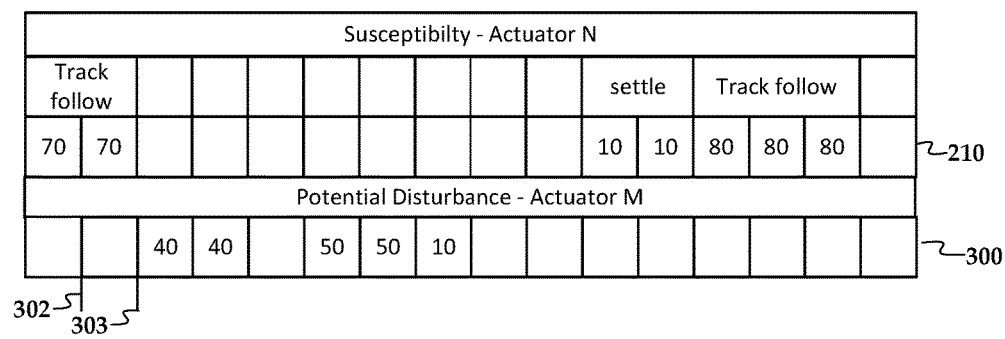

In FIGS. 3 and 4, block diagrams show how scheduling can be performed for Actuator M. In these figures, structure 210 includes the susceptibility data from Actuator N shown FIG. 2, which is overlaid with a structure 300 that includes potential disturbance expected when scheduling an operation for Actuator M. As shown in FIG. 3, the operation under consideration is a write with a seek operation, the seek can begin as soon as time 302. The potential disturbance due to the seek is translated and overlaid onto the susceptibility of Actuator N. In this case, Actuator N may get disturbed by Actuator M between times 302 and 304, while the other disturbance forces do not pose a risk.

In order to quantify the potential disturbance on Actuator N, a disturbance time may be defined. The disturbance time is a function of the value of the susceptibility scaling factor and the disturbance scaling factor. One possible method to determine disturbance time $T_d$ is shown in Equation (1) below, where $p_d$ is probability of a disturbance, $t_{rev}$ is revolution time, S is susceptibility value from structure 210, D is disturbance value from structure 300, and norm is a normalization value (e.g., maximum size of word used to store S and D). Applying this to the example in FIG. 3, this results in $T_d$=70 h*40 h/FFFFh*$t_{rev}$. If the structures 210, 300 store index values rather than scaled values, then another possible method to find the disturbance time is shown in Equation (2) below, where $F_d$ is a disturbance lookup function, and $i_S$ and $i_D$ are respective susceptibility and disturbance indices.

$$T_d = p_d t_{rev} = ((S*D)/\text{norm}) t_{rev} \quad (1)$$

$$T_{d,lookup} = F_d(i_S, i_D) \quad (2)$$

If there exists more than one entry per time region that may be impacted, then the probability calculation should take into account all entries. Probability of a disturbance for Z regions is calculated as shown in Equation (3) below, where $p_1, p_2, \ldots, p_Z$ are respective probabilities for regions 1 to Z. These computations are valid for the probability of a single fault. The probability of more faults may also be calculated, however there is diminishing value in doing so as the probability of multiple faults is significantly lower.

$$p_d = 1 - (1-p_1) \times (1-p_2) \times \ldots \times (1-p_Z) \quad (3)$$

For the operation shown in FIG. 3, the scheduler can consider delaying seek initiation, slowing the seek operation, and/or modifying the seek state transitions to minimize or eliminate the disturbance time. Examples of slowing the seek include limiting maximum acceleration and deceleration and modifying the seek current profile. Examples of modifying the seek state transitions include: pulse width modulation (PWM) on/off, rotational vibration feed-forward (RVFF) on/off, other adaptive feed-forward subsystem on/off, and single to dual stage actuation switching. Dual stage actuation involves activating a microactuator that is located near the read/write head to provide fine adjustment to the head's location. For these cases, the access time computation involving seek time and latency time is re-computed as the slower or delayed seek may have an impact on these times.

In FIG. 4, a block diagram shows the result of delaying the seek shown in FIG. 3. The seek has been moved later in time (to the right in the figure) and now begins at time 303. This results in a disturbance time of zero as there are no overlapping cells in structures 210, 300 with non-zero values. The disturbance time may be scaled or adjusted based upon other environmental or operating conditions, such as operational vibration.

A concept similar to disturbance time is susceptibility time, which uses the susceptibility tracking structures of the other actuator(s). The susceptibility of the operation under consideration is overlaid onto the disturbance structures of schedule operations to determine the time penalty associated with the possibility that this operation misses a revolution (e.g., late settle or off-track fault). An example of determining a susceptibility time is shown in the block diagram of FIG. 5.

This block diagram shows scheduling a seek operation for Actuator N. The operation under consideration is a write with a seek operation, as shown in structure 500. The seek can be initiated no earlier than time 504. The potential susceptibility is translated and overlaid onto the disturbance susceptibility of Actuator N, which is shown in structure 502. In this example, Actuator M may get disturbed by Actuator N between times 506 and 508. The susceptibility time is a function of the value of the susceptibility scaling factor and the disturbance scaling factor. The calculation is done in the same or similar manner of disturbance time shown above.

To make a scheduling decision, the expected access time plus disturbance time plus susceptibility time is computed for operations that are pending. Other terms may or may not exist in this equation and an embodiment may only consider disturbance time or susceptibility time. If the scheduling policy is to schedule a single command with the lowest time penalty for the multi-actuator device, then the operation with the lowest computed time value is selected.

Figure 5:
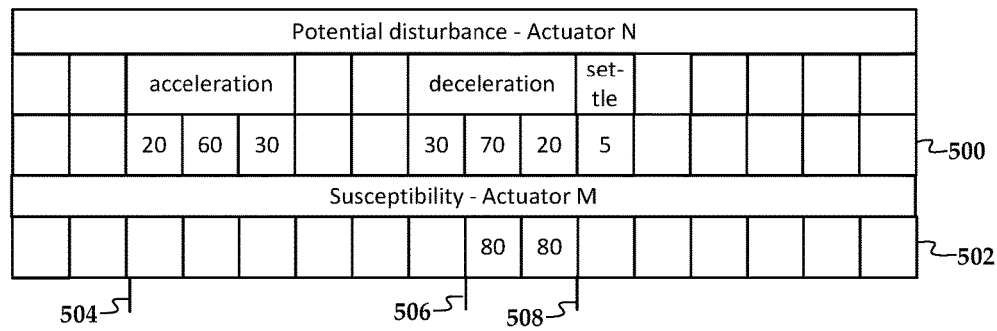
Figure 6:
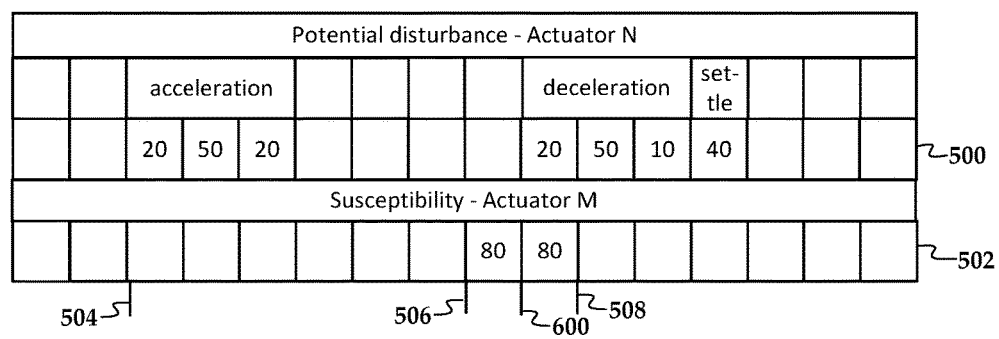

In this example of FIG. 5, one solution to reduce disturbance on actuator M is to slow down the seek operation. This solution is shown in FIG. 6. Note that while the seek still begins at time 504, the acceleration values are lower, resulting in the deceleration happening later, at time 600. Note that there is still some overlap between the structures 500, 502 at time 600, however the level of disturbance (20$h$ in this case) may be acceptable in order to have the seek of Actuator N complete in a target amount of time, e.g., without missing a revolution. In other cases, the acceleration may be reduced even more so that deceleration occurs at or beyond time 508.

Figure 7:
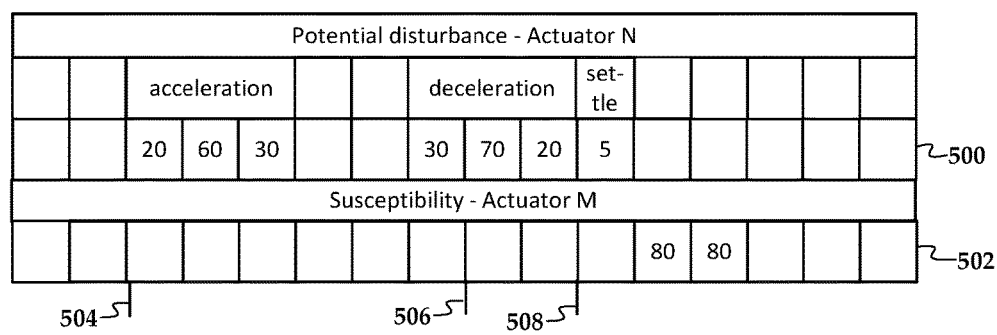

Other scheduling policies may favor one actuator over another or may make decisions based on selecting more than a singular command. In these cases, the computed time is a primary input into the decision method. For example, in the operations shown in FIG. 5, it may be that the operations performed by Actuator N have higher priority than the operations being performed by Actuator M. This priority may be on a per-operation and/or per actuator. In either event, because Actuator N has higher priority, the seek action shown in structure 500 may proceed as planned. The tracking operation shown in structure 502 may be delayed as shown in FIG. 7 to avoid interference.

Figure 8:
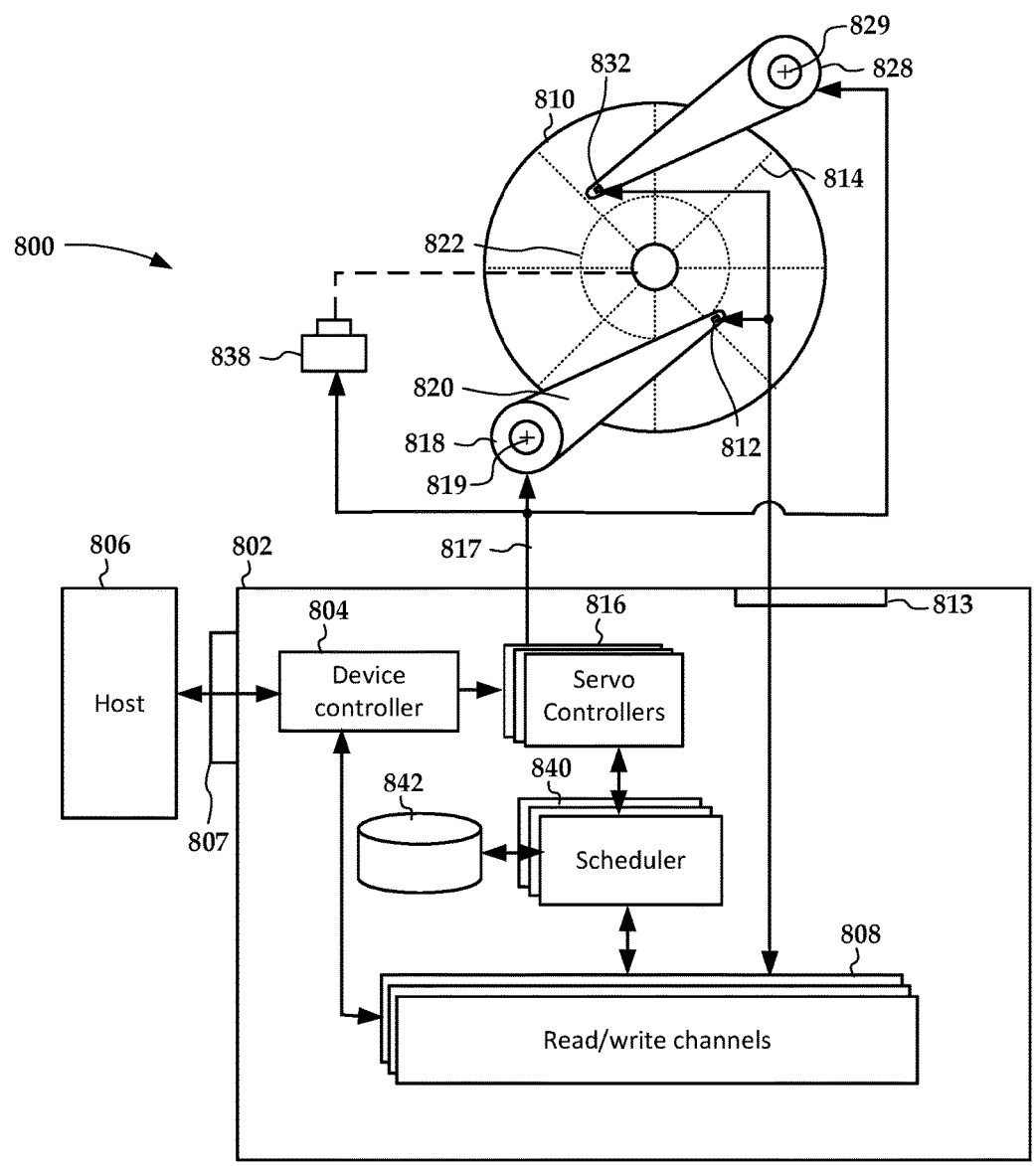
FIG. 8 is a block diagram of a disk drive apparatus according to an example embodiment.

In FIG. 8, a block diagram illustrates a data storage drive 800 that utilizes one or more actuators according to example embodiments. The apparatus includes circuitry 802 such as one or more device controllers 804 that process read and write commands and associated data from a host device 806 via a host interface 807. The host interface 807 includes circuitry that enables electronic communications via standard bus protocols (e.g., SATA, SAS, PCI, etc.). The host device 806 may include any electronic device that can be communicatively coupled to store and retrieve data from a data storage device, e.g., a computer, a server, a storage controller. The device controller 804 is coupled to one or more read/write channels 808 that read from and write to surfaces of one or more magnetic disks 810.

The read/write channels 808 generally convert data between the digital signals processed by the device controller 804 and the analog signals conducted through two or more heads 812, 832 during read operations. The two or more heads 812, 832 each may include respective read transducers capable of concurrently reading the disk 810, e.g., from the same surface or different surfaces. The read transducers may be configured to read in any mode, such as conventional single-track with single reader, or various TDMR modes like single track with multiple readers (MSMR) or multi-track with multiple readers (TDMR-MT). The two or more heads 812, 832 may also include respective write transducers that concurrently write to the disk 810. The write transducers may be configured to write using a HAMR energy source, and may write in various track configurations, such as conventional, SMR, and IMR.

The read/write channels 808 may include analog and digital circuitry such as digital-to-analog converters, analog-to-digital converters, detectors, timing-recovery units, error correction units, etc. The read/write channels 808 coupled to the heads 812, 832 via interface circuitry 813 that may include preamplifiers, filters, etc. As shown in the figure, the read/write channels 808 are capable of concurrently processing one of a plurality of data streams from the multiple heads 812, 832.

In addition to processing user data, the read/write channels 808 read servo data from servo marks 814 on the magnetic disk 810 via the read/write heads 812, 832. The servo data are sent to one or more servo controllers 816 that use the data to provide position control signals 817 to one or more actuators, as represented by voice coil motors (VCMs) 818. The VCM 818 rotates an arm 820 upon which the read/write heads 812 are mounted in response to the control signals 817. The position control signals 817 may also be sent to microactuators (not shown) that individually control each of the heads 812, e.g., causing small displacements at each read/write head.

The VCM 818 may be a stacked or split actuator, in which case two VCM parts are configured to independently rotate different arms about a common axis 819. In such a case, other heads (not shown) will access data on the disks simultaneously with that of heads 812, and these other heads may be coupled to circuitry 802 similar to illustrated head 832. In other embodiments, a second actuator, e.g., VCM 828, may independently and simultaneously rotate a second arm 830 about a second axis 829. Corresponding heads 832 may be rotated by the VCM 828 and may operate simultaneously with the heads 812 under commands from the one or more servo controllers 816.

One or more schedulers 840 access a common data structure 842 that access a common data store 842. This data store 842 may include susceptibility and disturbance structures as described above, or equivalents thereof. The schedulers 840 are operable by the controller 804 (or another processor or subprocessor) to determining time periods during which the multiple disk access operations will be performed. If it is found that that a target disk access operation will impact servo control of the other access operations, the target disk access operation is changed to reduce the impact to the servo control of the other disk access operations. This changing may include delaying the target operation, slowing down or speeding up the target operation, etc. In some cases, the target operation may have a high priority, in which case the other affect operations may be changed, e.g., delayed, paused, etc.

Figure 9:
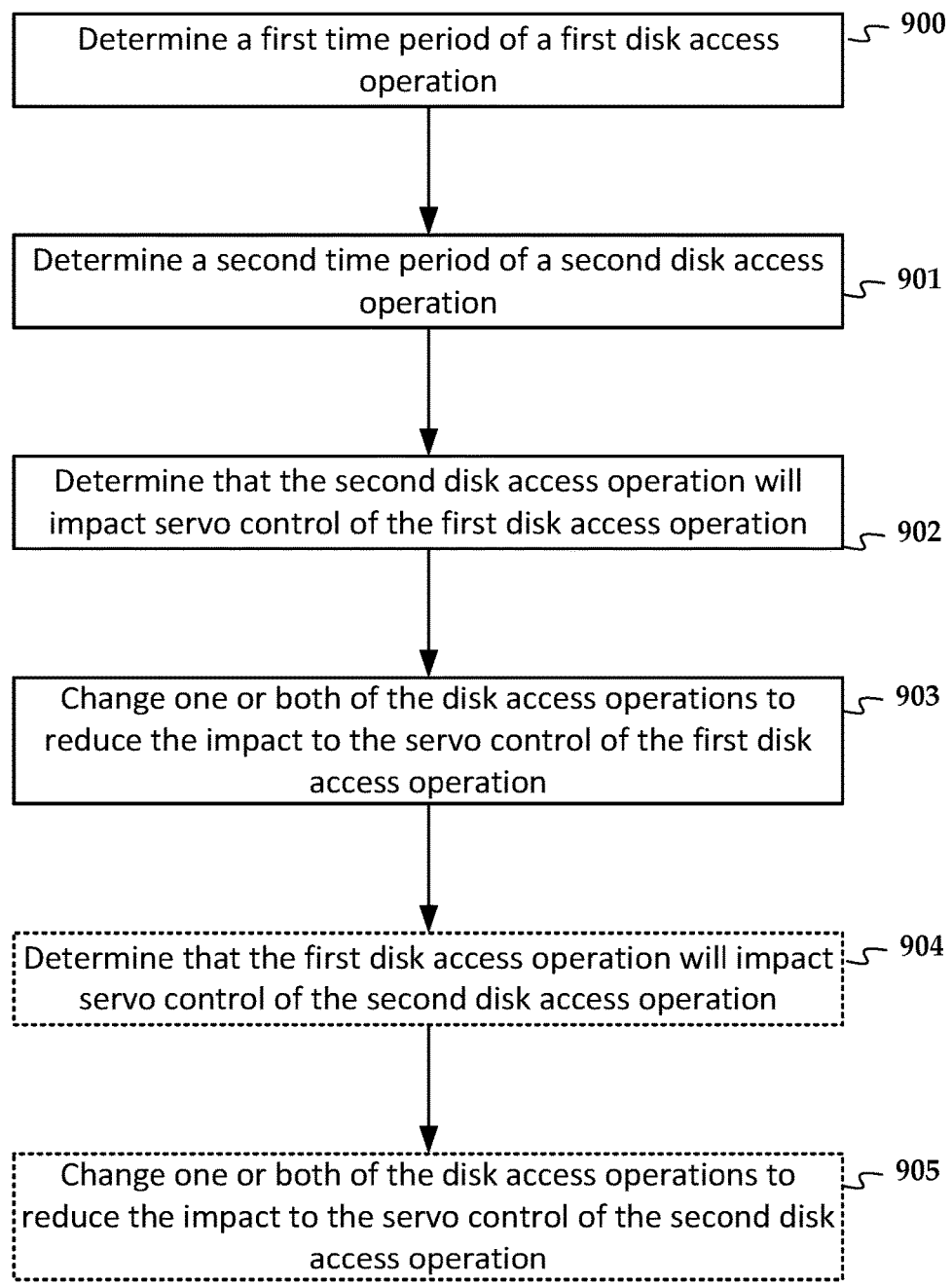
FIG. 9 is a flowchart of a method according to an example embodiment.

In FIG. 9, a flowchart shows a method according to an example. The method involves determining 900 a first time period during which a first head driven by a first actuator will be performing a first disk access operation. A second time period is also determined 901, during which a second head driven by a second actuator will be performing a second disk access operation. The first and second actuators are independently movable such that the first and second disk access operations are capable of being performed in parallel. It is determined 902 that the second disk access operation will impact servo control of the first disk access operation. One or both of the first and second disk access operations may be changed 903 to reduce the impact to the servo control of the first disk access operation. Optionally, the method may also involve determining 904 that the first disk access operation will impact servo control of the second disk access operation, and make changes 905 to one or both operations to reduce impact to the servo control of the second disk access operation.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   determining a first time period during which a first head driven by a first actuator will be performing a first disk access operation;
   determining a second time period during which a second head driven by a second actuator will be performing a second disk access operation, the first and second actuators independently movable such that the first and second disk access operations are capable of being performed in parallel;
   determining that the second disk access operation will impact servo control of the first disk access operation; and
   changing at least one of the first and second disk access operations to reduce the impact to the servo control of the first disk access operation.

2. The method of claim 1, wherein the first disk access operation comprises one of track following and settling.

3. The method of claim 1, wherein the second disk access operation comprises one of seek acceleration or deceleration.

4. The method of claim 1, wherein determining that the second disk access operation will impact servo control of the first disk access operation comprises:
   forming first and second tracking structures indexed from a current time to a future time, entries of the structures each containing a value representing one of potential disturbance or susceptibility for an associated time index; and
   comparing corresponding entries of the first and second tracking structures at a same future time to determine that a first potential disturbance of the first tracking structure overlaps a first susceptibility of the second tracking structure.

5. The method of claim 1, wherein changing the second disk access operation comprises changing a start time of at least one of the first and second disk operation.

6. The method of claim 1, wherein changing the second disk access operation comprises changing one of an acceleration and deceleration of the second actuator during the second disk access operation.

7. The method of claim 1, further comprising determining first and second priorities of the first and second disk access operations, wherein the second disk access operation is changed to reduce the impact to the servo control of the first disk access operation based on whether a delay in the second disk access operation is acceptable in view of the second priority relative to the first priority.

8. The method of claim 7, wherein if the delay in the second disk access operation is unacceptable in view of the second priority relative to the first priority, the method further comprising changing the first disk access operation instead of the second disk access operation.

9. The method of claim 1, wherein changing the second disk access operation comprises:
- determining an offset time that indicates a penalty for an access time of the second disk access operation due to the impact of the servo control on the first disk access operation;
- adding the offset time to the access time of the second disk access operation; and
- scheduling the second disk access operation according to the access time.

10. An apparatus comprising:
- interface circuitry operable to communicate with:
  - first and second actuators; and
  - first and second heads independently movable over a disk via the respective first and second actuators such that first and second disk access operations are capable of being performed in parallel by the respective first and second heads; and
- a controller coupled to the interface circuitry and operable to perform:
  - determining first and second time periods during which the respective first and second disk access operations will be performed;
  - determining that the second disk access operation will impact servo control of the first disk access operation; and
  - changing at least one of the first and second disk access operations to reduce the impact to the servo control of the first disk access operation.

11. The apparatus of claim 10, wherein the first disk access operation comprises one of track following and settling.

12. The apparatus of claim 10, wherein the second disk access operation comprises one of seek acceleration or deceleration.

13. The apparatus of claim 10, wherein determining that the second disk access operation will impact servo control of the first disk access operation comprises:
- forming first and second tracking structures indexed from a current time to a future time, entries of the structures each containing a value representing one of potential disturbance or susceptibility for an associated time index; and
- comparing corresponding entries of the first and second tracking structures at a same future time to determine that a first potential disturbance of the first tracking structure overlaps a first susceptibility of the second tracking structure.

14. The apparatus of claim 10, wherein changing the second disk access operation comprises changing a start time of at least one of the first and second disk operations.

15. The apparatus of claim 10, wherein changing the second disk access operation comprises changing one of an acceleration and deceleration of the second actuator during the second disk access operation.

16. The apparatus of claim 10, wherein the controller is further operable to determine first and second priorities of the first and second disk access operations, wherein the second disk access operation is changed to reduce the impact to the servo control of the first disk access operation based on whether a delay in the second disk access operation is acceptable in view of the second priority relative to the first priority.

17. The apparatus of claim 16, wherein if the delay in the second disk access operation is unacceptable in view of the second priority relative to the first priority, the controller is further operable to change the first disk access operation instead of the second disk access operation.

18. The apparatus of claim 10, wherein changing the second disk access operation comprises:
- determining an offset time that indicates a penalty for an access time of the second disk access operation due to the impact of the servo control on the first disk access operation;
- adding the offset time to the access time of the second disk access operation; and
- scheduling the second disk access operation according to the access time.

19. An apparatus, comprising:
- at least one disk;
- first and second actuators;
- first and second heads independently movable over the at least one disk via the respective first and second actuators such that first and second disk access operations are capable of being performed in parallel by the respective first and second heads; and
- a controller coupled to the first and second actuators and operable to perform:
  - determining first and second time periods during which the respective first and second disk access operations will be performed;
  - determining that the second disk access operation will impact servo control of the first disk access operation; and
  - changing at least one of the first and second disk access operations to reduce the impact to the servo control of the first disk access operation.

* * * * *